United States Patent [19]

Lambert, II

[11] Patent Number: 4,998,424
[45] Date of Patent: Mar. 12, 1991

[54] DOOR ATTACHABLE SAFE

[76] Inventor: Vincent Lambert, II, 224 Jewett St., Providence, R.I. 02908

[21] Appl. No.: 447,379

[22] Filed: Dec. 7, 1989

[51] Int. Cl.⁵ ............................................. E05B 65/52
[52] U.S. Cl. .......................................... 70/63; 70/161; 109/45; 109/51; 109/67; 206/387; 206/806
[58] Field of Search ........................... 70/63, 159–162; 109/45, 50–52, 67, 74, 76; 220/210; 206/387, 806

[56] References Cited

U.S. PATENT DOCUMENTS

| 2,716,882 | 9/1955 | Gill et al. | 70/159 |
|---|---|---|---|
| 2,813,620 | 11/1957 | Hanson | 70/63 X |
| 3,180,119 | 4/1965 | Goldfarb | 70/63 |
| 3,695,067 | 10/1972 | Bays | 70/63 |
| 3,934,434 | 1/1976 | Law | 70/63 |
| 3,979,932 | 9/1976 | Piche | 70/63 |
| 4,227,388 | 10/1980 | Nigrelli et al. | 220/210 X |
| 4,475,365 | 10/1984 | Swisher | 70/63 X |
| 4,632,242 | 12/1986 | Choi et al. | 206/806 X |
| 4,649,723 | 3/1987 | Appelbaum | 70/63 |
| 4,667,491 | 5/1987 | Lokken et al. | 70/63 |
| 4,694,668 | 9/1987 | Giletti et al. | 70/63 |
| 4,799,370 | 1/1989 | Cooper | 70/63 |

FOREIGN PATENT DOCUMENTS 1031727  5/1978  Canada ................................ 206/806

Primary Examiner—Lloyd A. Gall
Attorney, Agent, or Firm—Donald N. Halgren

[57] ABSTRACT

The present invention comprises a safe for providing an enclosure housing for video films or the like, the safe being lockable to a doorknob. The safe has a back panel and a front panel which define the housing. The back panel is disposable over a doorknob, and a front cover is hingedly swingable onto said front panel and said back panel to lock them together, and to lock the safe containing the video films or like products onto the doorknob.

13 Claims, 2 Drawing Sheets

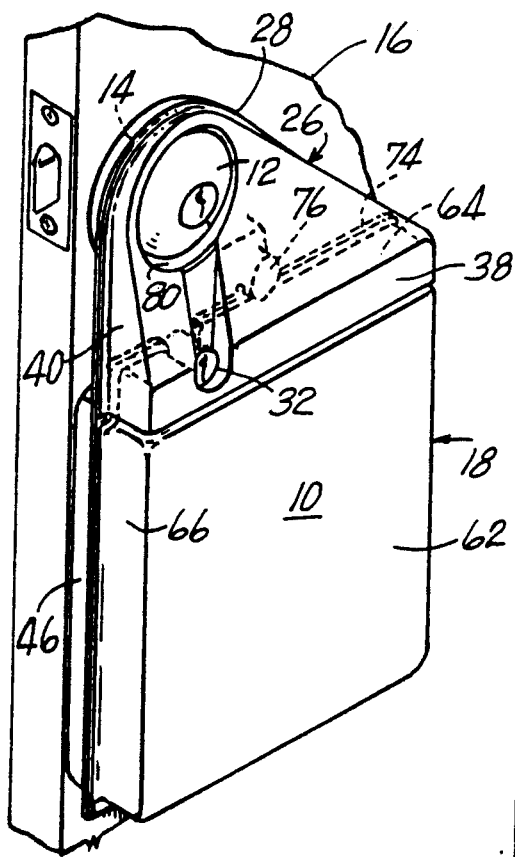
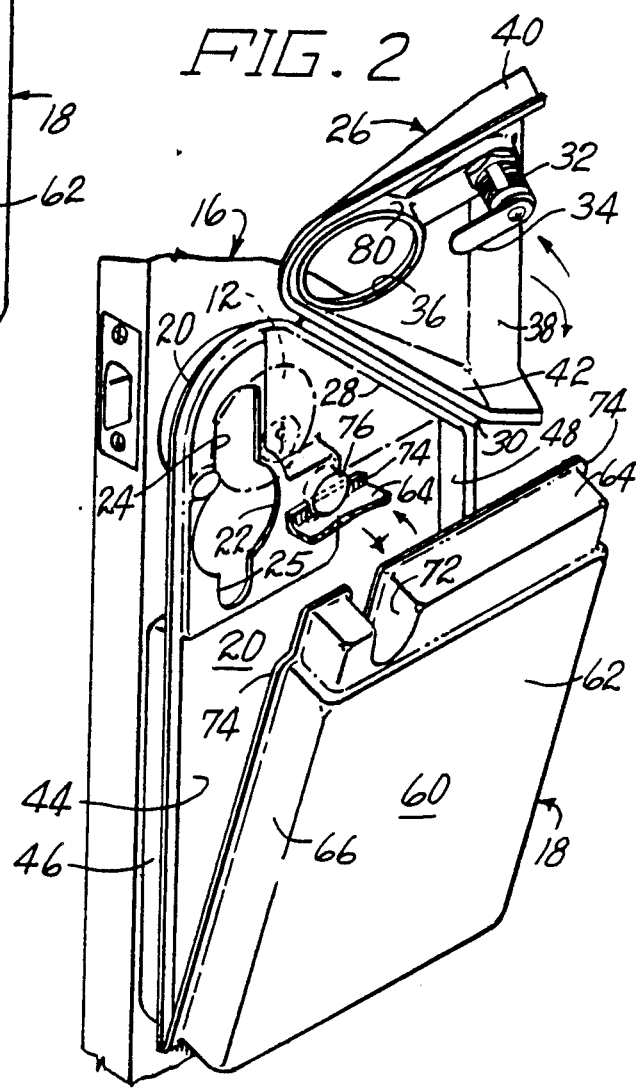

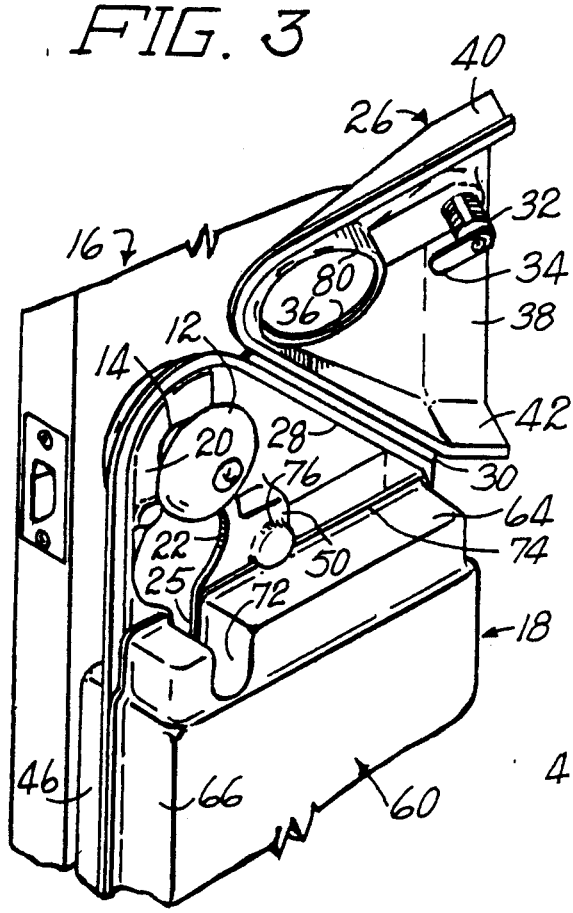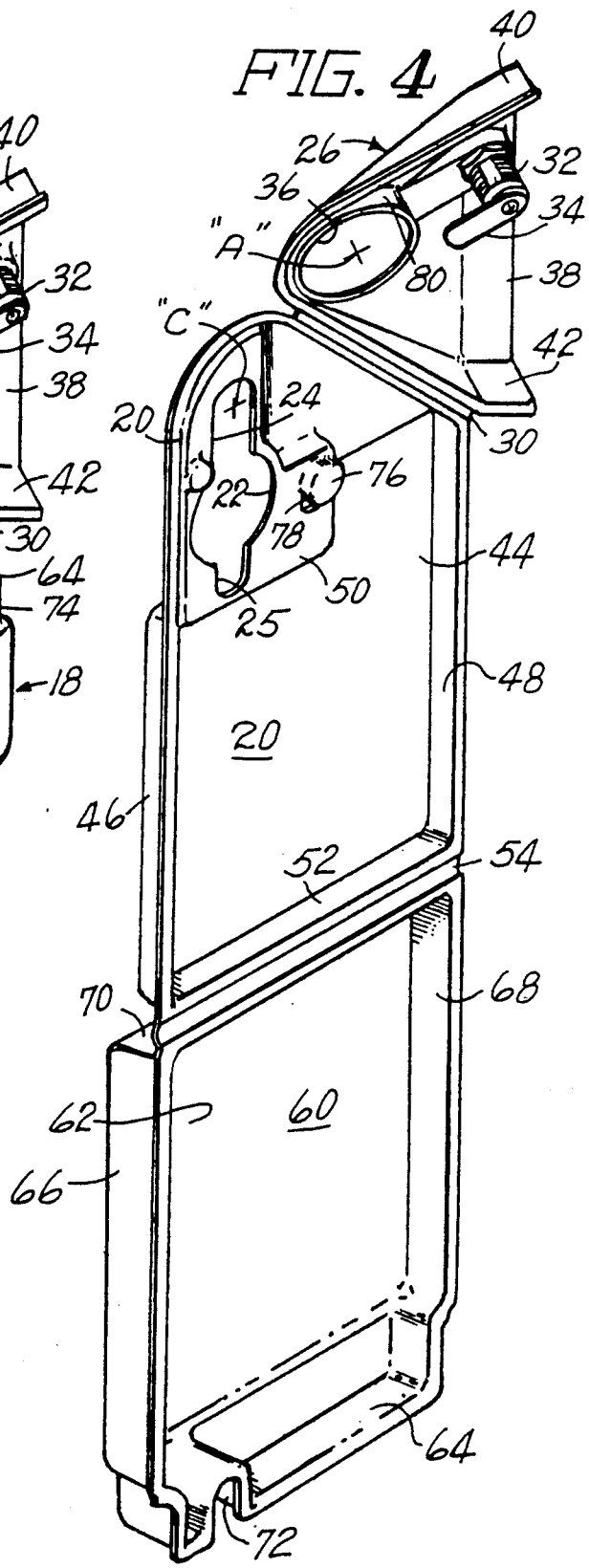

DOOR ATTACHABLE SAFE

BACKGROUND OF THE INVENTION

1. Field of the Invention

This invention relates to lockable safes, and more particularly to safes which are securable to doorknobs or the like, for storing video films or other valuables therein.

2. Prior Art

Our society has changed from a stay-at-home type, to one that is constantly on the go. People are often not content to or even able to wait at home for delivery people. Included in this changed society is the desire to view video films frequently, which are rented from a local distributor. Ordering these video films requires only a phone call. But actually getting and returning these films is more of a problem.

A good idea for solving this is having the films delivered to the user's home, and having them picked up by the film distributor. U.S. Pat. No. 4,799,370 to Cooper shows a door attachable security box for a pair of video films. This box however, precludes the closing of any storm door over the box, or minimizing its obtrusiveness. Its padlock has to be removed and may be possibly lost, as the films are inserted and/or removed.

U.S. Pat. No. 4,694,668 to Giletti et al, shows a security box for a door, but the box has two different openings for depositing and removal of articles stored therein, and the door has to be opened to remove the box.

The prior art has just not come up with a good solution for securing valuable products such as video films onto a door, which also keeps the products/films safe from the weather, easy to load and unload, while being removable from the door without having to open the box to expose its contents to loss or inclement weather.

BRIEF SUMMARY OF THE INVENTION

The present invention comprises a safe, particularly for video films but is usable for other valuable small products, which safe is readily attachable to a doorknob on the left or right hand side of a door. The video film safe of the present invention is preferably molded from a unitary extended plastic sheet of material. The video film safe is a closable housing having an extended rear portion which has an orifice to mate about a doorknob, and which permits the doorknob to function even when the safe is fully locked thereon. An upper cover includes a lock which overlaps the closable housing, to lock up the closable housing, and the video film safe itself, to the doorknob.

The video film safe, in its extended and fully open configuration may be divided into three components. The first component comprises a back panel of the closable housing: a left hand side wall, a right hand side wall, a lower wall and a stepped upper wall, on the periphery of the back panel, define the rear portion of the closable housing.

The second component of the video film safe comprises a front panel: a left hand side wall, a right hand side wall, a lower wall and an upper wall. The lower wall adjacent the back panel and the lower wall of the front panel each have a lip thereon which has a flexibly resilient web joining them, and which acts as a hinge between the rear and front portions of the closable housing.

The first portion also includes the extended portion which mates about a doorknob. The third component of the video film safe comprises a lockable cover. The lockable cover flap attaches to the extended portion across a diagonally directed hinge. The lockable cover is of generally triangular configuration, and mates over the extended portion of the back panel. The lockable cover has a distal edge which overlaps the upper wall of the front panel to provide the weather enclosability thereof.

The extended portion of the back panel has a generally central opening, with a first and a second slot disposed diametrically therefrom. The lockable cover flap has an outer opening which is in juxtaposable alignment with the upper slot and is dimensionally similar to the central opening in the extended portion of the back panel.

The lockable cover flap has a locking finger which is in juxtaposable alignment with one of the slots on the extended portion of the back panel. A raised securement module is disposed adjacent the central opening in the extended portion. The securement module has a groove disposed therein, parallel to the back panel.

In operation of the video film safe, the central opening of the extended portion of the back panel is placed over a doorknob and the safe is lowered so that the shaft of the doorknob is disposed into the upwardly directed slot of the opening in the extended portion. The products to be stored in the safe are placed between the back panel and the front panel. The front panel is pivoted upwardly about its lower hinge until it closes against the back panel. The upper wall of the front panel has a lip element thereon, which engages, because of the resilient nature of the material, the groove in the securement nodule. This holds the enclosure closed. The lockable cover flap is pivoted downwardly about its diagonally disposed hinge, so that the outer opening therein locks about the doorknob, holding it in place at the upper end of the slot in the back panel extended portion.

The locking finger lock mechanism is turned so that the finger, which has passed through the lower slot in the extended portion, is pivoted so as to engage the back of the extended portion, thus locking the cover lock flap to the front and back panels, and to the doorknob itself.

The present invention thus comprises a safe for video films or the like, for securement to a doorknob on a door, the safe comprising a pivotable front portion, an extended rear portion, and a pivotable cover locking portion, the rear portion having an opening with diametrically opposed slots extending therethrough for receipt of the doorknob, the doorknob shaft, and a locking member disposed on the cover locking portion. The rear portion has a securement module for holding the front portion closed against the rear portion, while the cover locking portion is raised away from its locked position.

BRIEF DESCRIPTION OF THE DRAWINGS

The objects and advantages of the present invention will become more apparent when viewed in conjunction with the following drawings, in which:

FIG. 1 shows a perspective view of safe for video films or the like, the safe shown in its closed locked configuration secured to the doorknob on a door;

FIG. 2 shows a perspective view of a safe with its front and cover locking portions both slightly pivoted away from the rear portion of the safe;

FIG. 3 shows a perspective view of a safe attached to a doorknob, with the front portion closed and secured to the rear portion of the safe, the cover locking portion being pivoted away therefrom; and FIG. 4 shows a perspective view of a safe in its fully open elongated configuration, without anything stored between the front and rear portions.

DESCRIPTION OF THE PREFERRED EMBODIMENT

Referring now to the drawings in detail, and particularly to FIG. 1, there is shown a safe 10 for the storage and containment of video films or like products, the safe 10 constructed preferably of unitary construction and made from a moldable plastic, which is readily attachable to a doorknob 12 which has a shaft 14 arranged into a door 16. The film safe 10 is a closable housing 18 having an extended rear portion 20, shown more clearly in FIGS. 2 and 4. The extended rear portion 20 has an orifice 22 which is of sufficient diameter to fit over the doorknob 12. A first, upwardly directed slot 24, wide enough to receive the shaft 14 of a doorknob 12, but not wide enough to let the doorknob 12 slip therethrough, is arranged radially away from the orifice 22 in the rear portion 20. A second, downwardly directed slot 25, diametrically opposed to the first slot 24, is disposed in the extended rear portion 20.

An upper lockable cover portion 26, is attached to the extended rear portion 20, along a diagonal edge 28 having a flexible hinge 30 thereat. The upper cover portion 26 includes a lock 32 which has a swingable finger 34 on its distal end. The finger 34 is alignable with the second slot 25 in the rear portion 26, and is extendable therethrough, when the cover portion 26 is pivoted closedly against the rear portion 20. The cover portion 26, of generally triangular configuration, has an orifice 36 therethrough, the center "A" of which, is in alignment with the center of the radius of curvature "C" of the distal end of the first upwardly directed slot 24. The cover portion 26 also has an elongated distal edge 38 and a pair of side walls 40 and 42.

The rear portion 20 includes a back panel 44 of generally rectangular configuration, with a left hand side wall 46, a right hand side wall 48, a stepped upper wall 50 which also is adapted to secure the cover portion 26, and a lower wall 52, which lower wall 52 extends to define a flexible hinge 54.

A front portion 60 of the housing 18, comprises a generally rectangularly shaped front panel 62, a top wall 64, a left side wall 66, a right side wall 68, and a bottom wall 70 which is a continuum of the hinge 54.

The top wall 64 has a trough shaped portion 72 which is in alignment with the edge of the second slot 25, as best shown in FIG. 3. The trough shaped portion 72 is also in alignment with the longitudinal axis of the lock 32. The top wall 64 has, as does the left and right hand side walls 66 and 68, a lip 74.

A raised securement nodule 76 extends outwardly towards the front cover portion 26, from the stepped upper wall 50 on the extended rear portion 20. The raised nodule 76 is disposed adjacent the orifice 22 in the stepped upper wall 50 of the extended rear portion 20. The nodule 76 has a groove 78 therein, cut partway thereacross, disposed generally parallel to the back panel 44.

To operate the video film safe 10, it is taken from its openmost configuration, as shown in FIG. 4, and placed over a doorknob 12, which is shown in phantom, in FIG. 2. The doorknob 12 is emplaced through the orifice 22 on the extended rear portion 20, the shaft 14 of the doorknob 12 being thin enough to slide into the first (upper) slot 24. The video film cartridges or the like, not shown, may be placed within the housing 18, as the front portion 60 thereof, is pivoted upwardly about its hinge 54, as shown in FIG. 2. The lip 74 of the top wall 64 of the front portion 60 is flexed so as to slide into mating engagement with the groove 78 on the lower portion of the securement nodule 76 on the stepped upper wall 50. The nodule 76 in effect, secures the front portion 60 to the back portion 20, thus defining the housing 18, as shown firmly closed, in FIG. 3.

The cover portion 26, is pivoted along the diagonal edge 28, of the extended portion 20, and about its flexible hinge 30, down into the configuration shown in FIG. 1. The finger 34 of the lock 32 is directed towards the orifice 36 in the cover portion 26, so that it is in alignment with second, lower slot 25, permitting it to extend therethrough. The lock 32 also mates with the trough 72 in the upper wall 64 of the front portion 60.

A key, not shown, may be introduced into the opening in the lock 32, so as to turn the finger 34 behind the stepped upper wall 50, to secure the cover portion 26 to the extended rear portion 20. The orifice 36 in the cover portion 26, has wall segments 80 which thus engages the perimeter of the doorknob 12, and keep the video film safe 10 from moving with respect to the doorknob, until the lock 32 is unlocked by moving the finger 34 into alignment with the second slot 25, and the cover portion 26 thus being permitted to be pivoted away from the doorknob 12.

The lower distal edge 38 of the cover portion 26 is disposed in an overlapping relationship with the top wall 64 and uppermost part of the front portion 60, when it is fully closed, thus effectuating the weather resistance of the video film safe 10.

Thus what has been shown is a convenient, cost effective, unobtrusive device for securing valuables, such as video films or the like, in a manner which is convenient both for film rentors as well as video supply stores who service those video rentors.

What I claim is:

1. A safe for providing a secure enclosure for products contained therein and for the temporary attachment of that enclosure to a doorknob on a door, said safe comprising:
    a housing for containnment of products therein:
    an extended portion of said housing for sliding engagement with a doorknob;
    a lock on a lockable cover portion to mate with both said extended portion and said housing to secure both to a doorknob;
    said housing comprising a back panel and a front panel hingedly disposed together, said back panel having a backside and further including said extended portion;
    said lockable cover portion having an opening which engages a doorknob disposed through said extended portion, to prevent movement of a safe therefrom.

2. A safe as recited in claim 1, wherein said back panel includes a securement means for holding said front panel thereagainst, in an unlocked configuration.

3. A safe as recited in claim 1, wherein said lockable cover portion overlaps said front panel to minimize the effect of weather on said safe.

4. A safe as recited in claim 1, wherein said cover portion and said extended portion have a diagonally disposed hinge therebetween, said diagonally disposed hinge permitting said safe to be arranged on either right or left hand doorknobs.

5. A safe as recited in claim 3, wherein said lockable cover portion carries a lock thereon, said lock having a finger which is pivotable so as to engage the backside of said back panel.

6. A safe as recited in claim 3, wherein said front panel has an upper wall having a trough arranged therein, said trough accommodating said lock of said lockable cover portion when said safe is fully closed.

7. A video film safe for providing an enclosure housing for video films, lockable to a doorknob, said video film safe comprising:
   a back panel having means for mating about a doorknob;
   a front panel having means for securement to said back panel;
   a lockable cover having means for securing a doorknob to said video safe, and having means for locking said front panel under said cover and to said back panel;
   said means for securement includes a nodule extending from said back panel, said nodule having means for gripping said front panel;
   said front panel having a lip which mates with said gripping means of said nodule; and
   said cover having a lock to secure both said front panel and said cover to said back panel, and to secure a door knob in a locked position with respect to said back panel.

8. A video film safe as recited in claim 7, wherein said back panel and said cover are articulable along a hinge.

9. A video film safe as recited in claim 8, wherein said cover, said back panel and said front panel are constructed in an integral manner of resilient plastic material.

10. A video film safe for providing an enclosure housing for video films, lockable to a doorknob, said video film safe comprising:
    a back panel having a back portion and door knob receiving means;
    a front panel hingedly arranged to said back panel;
    a cover portion having a means for securing a door knob in a non-removable condition from said back panel;
    said doorknob receiving means in said back panel comprising an orifice for receipt of a doorknob;
    said orifice also includes a first upper directed and a second lower directed slot extending diametrically therefrom, said first slot for receiving a shaft of a doorknob, said first slot being of smaller dimension than a doorknob.

11. A video film safe as recited in claim 10, wherein said means in said cover for securing a doorknob with respect to said back panel, comprises an orifice which holds the location of a doorknob in the distal end of said first slot, to retain the safe onto a doorknob.

12. A video film safe as recited in claim 11, wherein said cover has a lock so as to secure said cover to said front panel and said back panel, and said lock juxtaposed in said second slot.

13. A video film safe as recited in claim 12, wherein said lock is received through said second slot, to lock against the back of said back panel, preventing said safe from being removed from a doorknob without being unlocked.

* * * * *